(12) United States Patent
Chockler et al.

(10) Patent No.: US 9,832,278 B2
(45) Date of Patent: Nov. 28, 2017

(54) UTILITY-BASED INVALIDATION PROPAGATION SCHEME SELECTION FOR DISTRIBUTED CACHE CONSISTENCY

(71) Applicant: International Business Machines Corporation, Armonk, NY (US)

(72) Inventors: Gregory Chockler, Haifa (IL); Guy Laden, Jaffa (IL); Eli Luboshitz, Timrat (IL); Roie Melamed, Haifa (IL); Benjamin M Parees, Durham, NC (US); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 14/040,746

(22) Filed: Sep. 30, 2013

(65) Prior Publication Data
US 2015/0095584 A1 Apr. 2, 2015

(51) Int. Cl.
*G06F 12/08* (2016.01)
*H04L 29/08* (2006.01)
*G06F 12/0808* (2016.01)
*G06F 12/0817* (2016.01)

(52) U.S. Cl.
CPC ...... *H04L 67/2852* (2013.01); *G06F 12/0808* (2013.01); *G06F 12/0824* (2013.01)

(58) Field of Classification Search
CPC .......................... G06F 12/0808; G06F 12/0824
See application file for complete search history.

(56) References Cited

U.S. PATENT DOCUMENTS

| | | | |
|---|---|---|---|
| 6,138,158 A * | 10/2000 | Boyle et al. | 709/225 |
| 7,783,602 B2 | 8/2010 | Iyengar et al. | |
| 8,108,623 B2 | 1/2012 | Krishnaprasad et al. | |
| 8,644,702 B1 * | 2/2014 | Kalajan | 396/429 |
| 2012/0173845 A1 | 7/2012 | Venkataramani | |
| 2012/0297010 A1 | 11/2012 | Zhang | |

OTHER PUBLICATIONS

Yin et al., "Engineering Web Cache Consistency", ACM Transactions on Internet Technology, vol. 2, No. 3, Aug. 2002, pp. 224-259.
Yin et al., "Engineering server-driven consistency for large scale dynamic Web services", In Proceedings of the 2001 International World Wide Web Conference, 2001, pp. 45-57.
(Continued)

*Primary Examiner* — Reginald Bragdon
*Assistant Examiner* — Eric Loonan (57) ABSTRACT

A computerized method for dynamic consistency management of server side cache management units in a distributed cache, comprising: updating a server side cache management unit by a client; assigning each of a plurality of server side cache management units to one of a plurality of propagation topology groups according to an analysis of a plurality of cache usage measurements thereof, each of said propagation topology groups is associated with a different write request propagation scheme; and managing client update notifications of members of each of said propagation topology groups according to the respective said different write request propagation scheme which is associated therewith.

15 Claims, 3 Drawing Sheets

(56) References Cited

OTHER PUBLICATIONS

Mershad et al., "SSUM: Smart Server Update Mechanism for Maintaining Cache Consistency in Mobile Environments", IEEE Transactions on Mobile Computing, vol. 9, Issue 6, pp. 778-795, 2010.

Fawaz et al., "DCIM: Distributed Cache Invalidation Method for Maintaining Cache Consistency in Wireless Mobile Networks", IEEE Transactions on Mobile Computing, vol. 12, Issue 4, pp. 680-693, 2013.

* cited by examiner

UTILITY-BASED INVALIDATION PROPAGATION SCHEME SELECTION FOR DISTRIBUTED CACHE CONSISTENCY

BACKGROUND

The present invention, in some embodiments thereof, relates to cache consistency systems and methods for managing them and, more particularly, but not exclusively, to hybrid distributed cache consistency systems and methods for managing them.

Distributed cache consistency is an important practical problem which arises in many domains and systems such as distributed file systems, web caches, content distribution networks, Domain Name System (DNS) services, Memory-Grids and NoSQL data stores to name a few. In such systems, a client machine often caches data retrieved from a server machine, in order to potentially avoid retrieving this data again in the near future. If during the time the client is caching the data, this data is modified at the server (e.g. an update is sent from a different client) then the cached data is stale (i.e. inconsistent). In many use-cases it is important to avoid stale data. Thus, given a distributed cache, the cache consistency mechanism is typically used to ensure client caches are made aware of updates that have occurred to their client side cache unit contents in a timely manner. Distributed cache consistency mechanisms can be broadly classified as client-based or server-based.

Client-based solutions rely on time-to-live (TTL) mechanisms or periodic polling. In both of these approaches the client's cache can become stale if an update occurs between two polls or shortly after an object is retrieved from the server. In many applications data freshness is of critical importance making client-based approaches unsuitable.

In server-based solutions the servers inform clients of updates as they occur thus improving the data-freshness of client caches. The servers send clients a notification message when an update occurs and the clients then either update their cache with the newer object version or at least remove the stale object from the cache so that the newer version is retrieved on the next access. Server-based solutions typically must track object caching by clients, in order to send update notifications to the appropriate clients.

An additional cache consistency approach is hierarchical caching, also referred to as cooperative caching. Hierarchical caching is the sharing and coordination of cache state among multiple communicating caches. A cache hierarchy consists of levels of caches, having parent-child relationships, which communicate with each other. Cache servers in hierarchical caching networks cooperate with one another. A proxy can forward requests, for example, to a parent cache level. Such cooperation is intended to achieve improved caching in terms of network load, stale time etc.

SUMMARY

According to an aspect of some embodiments of the present invention there is provided a computerized method for dynamic consistency management of server side cache management units in a distributed cache, comprising: recognizing an event of a server side cache management unit by a client; assigning each of a plurality of server side cache management units to one of a plurality of propagation topology groups according to an analysis of a plurality of cache usage measurements thereof, each of the propagation topology groups is associated with a different write request propagation scheme; and managing client update notifications of members of each of the propagation topology groups according to respective the different write request propagation scheme which is associated therewith.

Optionally, the event comprises at least one of writing an element of the server side cache management unit, reading an element of the server side cache management unit, changing load of a network connecting the client and the server, changing load on client itself, notification by the client concerning eviction of a client side cache management unit and passing time. Optionally, the write request propagation scheme is at least one of: a client-set write request propagation scheme recording a plurality of clients sets and according to clients' access to the plurality of server side cache management units and sending a plurality of cache messages according to the plurality of clients sets; and a least recently used write request propagation scheme, recording usage time for the plurality of server side cache management units and sending a plurality of cache messages for least recently used server side cache management units wherein each the plurality of clients sets is a sub-group chosen from a plurality of clients. Optionally, the write request propagation scheme is at least one of notifying all clients, a broadcasting protocol, and a periodic update protocol for sending periodic cache updates to at least one client cache. Optionally, the assigning is performed independently of a cache transaction. Optionally, the method further comprises: bounding a memory of a computer readable medium; and storing at least one of the plurality of cache datums responsive to chosen the write request propagation scheme in bounded the memory. Optionally, the method further comprises: storing at least one of the plurality of server side cache management units responsive to chosen the write request propagation scheme; estimating an amount of distributed messages saved by the storing; wherein the analyzing is performed by calculating a ratio between estimated the amount of distributed messages and a digitalized-memory size used for the storing of the server side cache management units. Optionally, the method further comprises: manually choosing, by a user, a substitute write request propagation scheme for at least one of the plurality of server side cache management units, the substitute write request propagation scheme over-riding automatically chosen the write request propagation scheme. Optionally, a plurality of write request propagation scheme supporting measurements are recorded on a server local storage by one write request propagation scheme. Optionally, the analyzing and the assigning are iteratively repeated.

According to an aspect of some embodiments of the present invention there is provided a computerized method for cache dynamic consistency management of server side cache management units by assignment of a write request propagation scheme to a single server side cache management unit, comprising: receiving a plurality of write request propagation scheme; receiving a server side cache management unit, having a plurality of cache usage measurements; and automatically assigning one of the plurality of write request propagation schemes to the server side cache management unit.

Optionally, the method further comprises: discarding the plurality of cache usage measurements according to chosen the one of the plurality of write request propagation schemes. Optionally, the automatically assigning is not relative to other cache usage measurements. Optionally, the method further comprises: receiving a plurality of server side cache management units, each having a plurality of cache usage measurements; wherein the automatically assigning is performed by: analyzing the plurality of cache usage measurements; and individually associating a write request propagation scheme with each of the plurality of server side cache management units according to analysis of the plurality of cache usage measurements of a subset of the plurality of server side cache management units.

According to an aspect of some embodiments of the present invention there is provided a computer program product for cache dynamic consistency management of server side cache management units by assignment of a write request propagation scheme to a single server side cache management unit, comprising: a computer readable storage medium; first program instructions to receive a plurality of write request propagation schemes; second program instructions to receive a server side cache management unit, having a plurality of cache usage measurements; and third program instructions to automatically assigning one of the plurality of write request propagation schemes to the server side cache management unit; wherein the first, second and third program instructions are stored on the computer readable storage medium.

According to an aspect of some embodiments of the present invention there is provided a system for dynamic cache consistency management of server side cache management units by assignment of server side cache management units to write request propagation schemes, comprising: a memory of a computer readable medium; a monitoring engine: automatically choosing, using a computerized processor, a subset of a plurality of cache usage measurements for monitoring; monitoring the subset of the plurality of cache usage measurements; storing a plurality of values of the plurality of cache usage measurements collected by the monitoring on the memory; a cache management engine: analyzing stored the plurality of values; and automatically assigning, using a computerized processor, each of a plurality of server side cache management units, each datum having the plurality of cache usage measurements, to a write request propagation scheme according to the analyzing.

Optionally, the memory is bounded and the cache management engine stores at least one of the plurality of server side cache management units responsive to chosen the write request propagation scheme in bounded the memory. Optionally, the cache management engine stores at least one of the plurality of server side cache management units responsive to chosen the write request propagation scheme; the cache management engine estimates an amount of distributed messages saved by storing for a server side cache management unit; and the cache management engine analyzes by calculating a ratio between estimated the amount of distributed messages and a digitalized-memory size used for the storing of the server side cache management unit. Optionally, automatically choosing is randomly selected. Optionally, the automatically assigning is initiated as a random assignment of one of the plurality of write request propagation schemes to each of the plurality of server side cache management units.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to cache consistency systems and methods for managing them and, more particularly, but not exclusively, to hybrid distributed cache consistency systems and methods for managing them.

According to some embodiments of the present invention, a write request propagation scheme is selected for each server side cache management unit. As used herein, the phrase write request propagation scheme means a cache algorithm, an instruction and/or a set of rules that a computer program and/or a hardware uses to manage a cache of information stored on a computing device. As used herein, the phrase server side cache management unit means a data unit saved on a server comprising at least one data unit key and exactly one data unit value. A sever side cache management unit may further comprise a meta-data unit. Server side cache management units may be implemented as a cache, a database and/or other mapped data storage methodologies on a server. As used herein, the phrase data unit key means identification means such as a unique identification number, a symbol and/or a hash key, which is used by a cache, a database or other storage mechanism as an identifier for recognition of a data component in storing and/or retrieving the data entity. As used herein, the phrase data unit value means an expression composed of a set of symbols, for example, a string of American Standard Code for Information Interchange (ASCII) characters and/or a numerical number. As used herein, the phrase meta-data unit means additional datum associated with a data unit key and/or data unit value. Meta-data may comprise, for example, a client set, locks and/or permissions. In a server-based cache consistency system, a client side cache unit is managed by a server side cache management unit. In such a server-based cache consistency system, when a write request (e.g. update, insert) is received by a server for a server side cache management unit, a propagation scheme is selected for notifying clients caching the client side cache unit, managed by that server side cache management unit, that an update has occurred. The selected write request propagation scheme may be a notify-all write request propagation scheme or a write request propagation scheme requiring client-sets tracking. As used herein, the phrase client-set means a collection of cache clients' references such as, for example, cache clients' network identifiers, cache clients' address etc. The collection of cache clients may be a list, a hash table, a queue, a stack, a bag, and/or a dictionary. Selecting a write request propagation scheme for each server side cache management unit individually results in a hybrid solution which adaptively chooses the best approach on a per-key basis. Write request propagation scheme selection may further be performed on groups of server side cache management units. In one embodiment, server side cache management units are classified as belonging to one of two groups: for the first group client-sets are maintained and the write request propagation scheme is applied using these client-sets, while for the second group a notify-all write request propagation scheme is applied and no client-sets are maintained.

In a client-server based cache consistency system, according to some embodiments of the present invention, a client has a cache with multiple client side cache units. Each client side cache unit comprises at least one data unit key and exactly one data unit value. The client side cache unit may further comprise a meta-data unit. Each server side cache management unit comprises at least one data unit key and exactly one data unit value. Client side cache units cache elements of server side cache management units, such as, for example, a data unit key and/or a data unit value. The client typically manages its own cache. The server notifies its clients about updates of server side cache management units. The sever side cache management unit may further comprise a meta-data unit. The data unit value of the client side cache unit may be a copy of the data unit value associated with the server side cache management unit. The meta-data of the server side cache management unit may be independent from the meta-data of the client side cache unit.

Coupling meta-data with other elements of server side cache management units may reduce required storage memory and/or result in a more efficient lookup of clients' sets Meta-data of a server side cache management unit may comprise, for example, caching clients sets. Each client side cache unit is typically managed by a single server. In a typical setting multiple servers may be used as long as each server manages a different sub set of client side cache units. Server management of a client side cache unit typically comprises invalidating the cache unit. An invalidated client side cache unit holds stale data so any future retrieval of it will first contact the server. Client side cache unit management tasks such as creating, deleting and/or updating, deleting and updating of cache units are typically perform by the client. A Client may initiate management of a client side cache unit. The initiation may be performed by a client sending a server relevant messages over a network. A server may initiate management of a client side cache unit. The initiation may be performed by a server sending a client relevant messages over a network.

According to some embodiments of the present invention, a write request propagation scheme is adaptively chosen for each server side cache management unit. The write request propagation scheme choice may be performed individually for each server side cache management unit. For example, client-sets are tracked for server side cache management units where this results in the most benefit. The benefit from maintaining a client-set for a particular server side cache management unit may be estimated and/or calculated by assessing expected number of notification messages to clients using a client-sets propagation scheme versus the number for using a notify-all propagation scheme (for that specific server side cache management unit). A notify-all write request propagation scheme is used for those server side cache management units where the benefit (in saved notification messages) exceeds the cost (in memory usage) of maintaining client sets. The write propagation scheme of a particular key may change over time. The write propagation scheme change may occur, for example, due to workload changes, e.g., a particular key becomes more (or less) frequently accessed than before.

A server managing cache consistency typically tracks server side cache management units caching by clients. Such tracking may be implemented by keeping clients' set for each server side cache management unit. Maintaining this information on the servers may consume large amounts of memory as the number of objects and clients grows. This limits the scale at which this type of solution can be adopted. One workaround is to have servers broadcast update-notifications to all clients. While this saves memory on the server it is wasteful in the number of messages sent which will grow with the number of clients. Essentially this solution does not solve the scalability problem either. Approaches to deal with the issue such as multicast and/or multicast hierarchies are difficult to deploy since multicast support is often not available in many environments.

The write request propagation scheme choice balances between the memory cost of maintaining client-sets in a cache managing server and the cost in resources of sending numerous notification messages (network, Central Processing Unit (CPU) etc. . . . ). For example, there is not much benefit gained by maintaining a client-set for a key which is cached at many/most clients, since a notify-all could be used for such a key without causing many needless messages. Another example is that not much benefit will be gained from maintaining a client-set for a key that is updated only very rarely.

Optionally, a write request propagation scheme is intelligently chosen for each and every server side cache management unit according to an assessment of the server side cache management unit's usage. Optionally, a sampling based, i.e. probabilistic, iterative method is provided to choose the best keys to maintain client-sets for.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
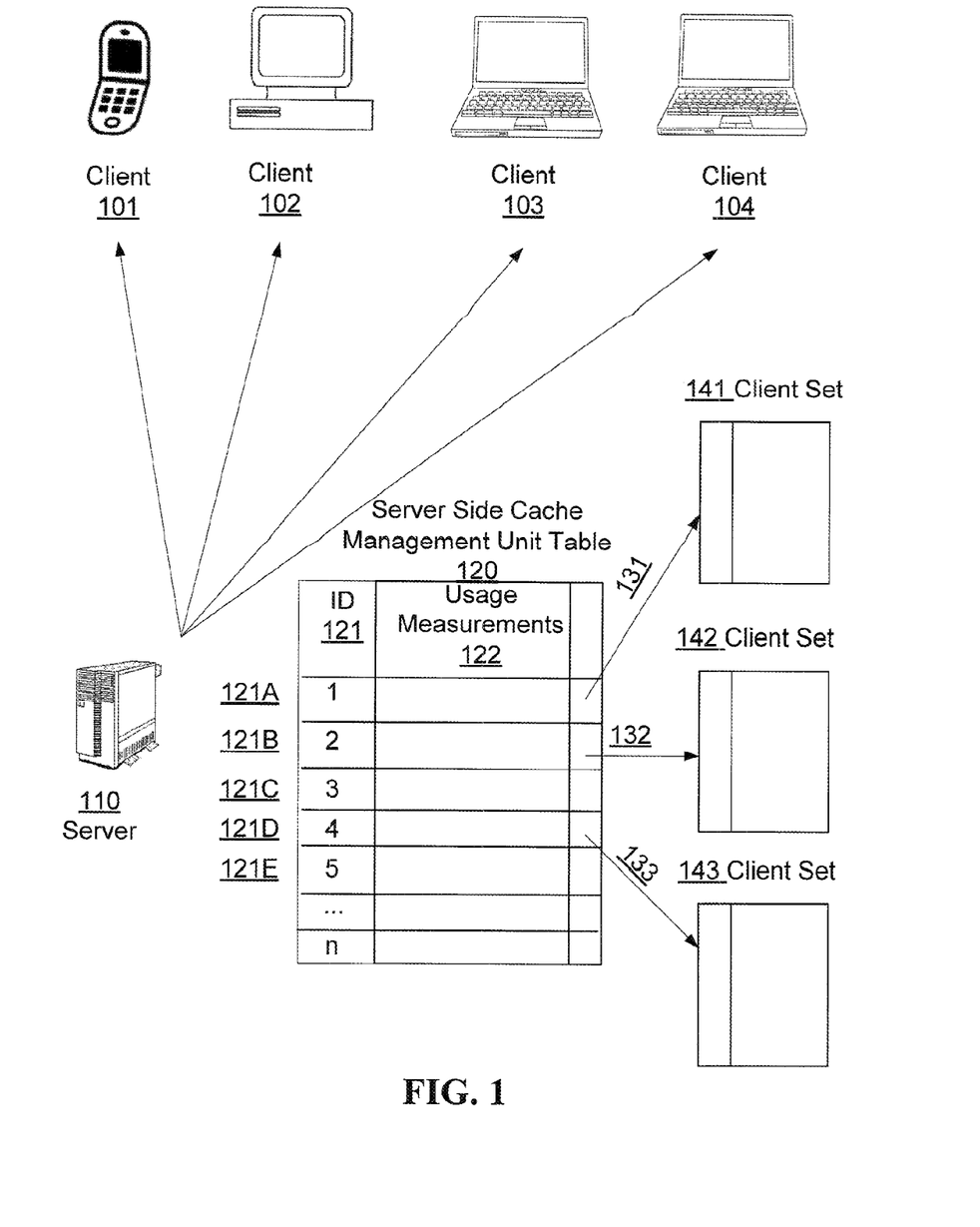
FIG. 1 is an illustration of a dynamic cache consistency management system of a server and multiple caching clients, according to some embodiments of the present invention.

Reference is now made to FIG. 1 illustrating a dynamic cache consistency management system of a server 110 and multiple caching clients, according to some embodiments of the present invention. In this particular embodiment of the present invention, each caching client manages its own cache. Cache management by a client may be performed according to the amount of memory available to the client and/or the requests the clients receives and sends etc. The server 110 notifies the clients 101-104 about updates to server side cache management units. The notifications are provided to the clients 101-104 in essentially real time as the updates occur. The server 110 and/or the clients it updates may reside in a distributed storage and/or distributed processing environment such as a cloud. The clients may be of diverse types, such as a mobile phone 101, a personal computer 102, a laptop 103-104, a virtual machine, a storage server, a web application server and/or a tablet etc. . . . The clients may be of the same electronic device type. Optionally, non caching clients (not shown) are connected to the server 110 as well. Non caching clients may update server side cache management units. The server 110 manages the server side cache management units' 121A-121E. The server side cache management units may be managed, by a variety of data structures such as a dictionary, a hash table and/or tree. In this exemplary embodiment, server side cache management units are managed by a server side cache management units table 120. The columns of this exemplary table 120, comprises a server side cache management unit identification 121 and related cache usage measurements 122. As used herein, the phrase usage measurement means assessing, sizing, quantifying and/or calculating utilization of a server side cache management unit by one or more clients. The rows of this exemplary table 120, comprises server side cache management units 121A-121E. A computer program randomly selects a set of keys for which to store cache usage measurements. For example, server side cache management units 1 121A, 3 121C and 4 121D were selected. This set is referred to as the candidate set. Cache usage measurements are collected based on clients 101-104 utilization of each server side cache management unit 121A-121E. Cache usage measurements may be, for example, the number and request rate of read operations, the number and request rate of write operations, the ratio of reads to writes, the time gap between adjacent calls, the number of unique clients reading/writing the server side cache management unit, the size of the data value, etc. Then, a computer program assesses these cache usage measurements. Another computer program picks server side cache management units out of the candidate set 121A, 121C, 121D for which to maintain client-sets 141-143. The set of units for which client-sets are maintained is referred to as the chosen set. The chosen set in this example includes 121A, 121D. The choice of the server side cache management units for the chosen set may be performed based on the cache usage measurements.

Optionally, the initial chosen set may be randomly selected. For server side cache management units 121B, 121C, 121E without client sets 141-143 the server 110 updates the clients' 101-104 cache by reverting to a notify-all write request propagation scheme, i.e. sending a message to all clients. The client update may be set to every write/delete operation, periodic update etc. For the other server side cache management units 121A, 121D, messages to clients 101-104 are sent according to the clients' 101-104 usage of the specific key as tracked in the client sets 141, 143. The number of messaged sent using the client sets 141, 143 is less than or equal to the number of messages sent using a notify-all write request propagation scheme. After a predefined time frame and/or number of requests server side cache management units are again randomly selected to the candidate set. This time server side cache management unit 2 121B is chosen for the candidate set. The cache usage measurements of key 2 121B show a greater benefit in maintaining a client set for this key 121B compared to key 4 121D, but not compared to key 1 121A. As a result, the chosen set includes key 1 121A and key 2 121B, but not key 4 121D. This process continues iteratively. In stable usage conditions this process converges to a chosen set which optimizes the trade-off between the memory cost of maintaining client sets with cost(s) such as network cost (i.e. sending and receiving update messages).

Optionally, multiple servers are used to notify and/or update the same set of clients. For example, server 1 notifies and/or updates clients about updates of server side cache managing unit having a data unit key starting with the letter A. Server 2 notifies and/or updates clients about updates of server side cache managing unit having a data unit key starting with the letter B and so on and so forth. In such an embodiment of the present invention a client may be connected to as little as a single server and/or as much as all managing servers.

Optionally, the notion of benefit from a write request propagation scheme is formalized. One exemplary utility function assessing the benefit of a client set based notification write request propagation scheme is to estimate how many notification messages would be saved by maintaining a client-set for this key. Such a per-key client-set utility function may be approximated at runtime.

Let $S(k)$ be the number of notifications saved by maintaining a client set for key k.

$S(k)$ may be defined as follow: $S(k)=W(k)*C-W(k)*X(k)$ where

C denotes average total number of clients;

$W(k)$ denotes a number of writes of the key; and $X(k)$ denotes a number of clients in the key's client set The per-byte utility of a client-set (number of notifications saved per byte) is defined as:

$U(k)=S(k)/M(X(k))$ where $M(X(k))$=Number of bytes needed to store client-set of size $X(k)$ Note that if client sets all have fixed size then $M(X(k))$ is the same for all keys and so for comparing utilities it suffices to compare $S(k)$.

The abovementioned definition of $U(k)$ assumes $X(k)$, the number of clients in k's client-set, is known, and this may not be so for cache unit in the candidate set (since we don't maintain client-sets for candidates). However, the utility of server side cache management units may be estimated even when a client set is not available and/or unknown. For this purpose $R(k)$, the number of reads to side cache management unit k at the server, provides as an approximation to $X(k)$ since typically a read from a client indicates that the unit's value is now cached at the client. $R(k)$ is larger than $X(k)$ since clients may evict units from their cache without informing the server. Multiple reads of k from the same client may occur. However, for a client to read k from the server it must have evicted k from its cache. This pattern, i.e. evict-read-evict-read, is unlikely to occur often within a short time-frame and $R(k)$ should typically be a close approximation to $X(k)$.

Optionally, the automatic choice of write request propagation scheme, for each server side cache management unit by a cache management engine, is supplemented with client characteristics. Client characteristics are, for example, communication speed, latency for reaching clients, clients load, network bandwidth, average network load, used communication protocol, port number, random access memory (RAM) size, priority, and/or device type. Clients may be divided into groups based on such client characteristics. The write request propagation scheme is chosen for each clients group based on the characteristics of clients in that group. For example, a notify-all write request propagation scheme is chosen for a group of clients whom are fastest to notify (e.g. near-by, idle). Accordingly, an update regarding a write modification of a certain server side cache management unit is performed by sending a notification to all fastest-to-notify clients. Fastest-to-notify clients are updated about server side cache management unit write modifications regardless of the propagation scheme employed for this particular server side cache management unit. Fastest-to-notify clients may be, for example, nearby clients. A shorter clients set, containing only slower clients, for example, clients located in another continent and/or communicating over the WAN or heavily loaded, is maintained as a result. Optionally, for slower clients one may use the schemes outlined above to select keys for which maintaining client-sets is most worthwhile (notify-all-slow clients is used for the other keys). Applying a local storage write request propagation scheme to server side cache management unit(s) results in less memory consumption, as a shorter client set is maintained for each server side cache management unit. The Fastest-to-notify clients are excluded from the client set maintained for server side cache management units managed by a local storage write request propagation scheme. According to another example, a group of clients comprises clients requiring going over a heavily congested network segment for sending a notification message. Such a client group may be excluded from a notify-all write request propagation scheme applied to a specific server side cache management unit and/or a group of server side cache management units. Excluding this client group may save sending spurious notification messages, i.e. notify-all, over a congested network.

Optionally, server side cache management units are bucketed for the purpose of maintaining the scheme's metadata, e.g. the chosen set, the candidate set and the client sets. Separate chosen sets and candidate sets are maintained per bucket rather than globally. Bucketing may reduce lock contention since any locks need only be handled at the bucket level rather than globally. In addition, the partitioning allows uniquely identifying a server side cache management unit within a bucket using 1 or 2 byte integers rather than a 4/8 byte pointer. Associating a server side cache management unit key with a bucket can be done using a hash of the key and in this sense a bucket is similar to a hash table bucket and contains the scheme's metadata for all the keys which hash to it. The net result is that a bucketing scheme could reduce lock contention and in addition could reduce the amount of memory needed to implement this approach since fewer pointers are needed. The following pseudo-code details an implementation of assigning a unique identifier (ID) to each server side cache unit data key within a bucket:

```
Key.id is initialized to 0 at system startup
On access to key
If Key.id == 0 and Key.id !=MAX_ID // first access to key
  Lock Bucket
  If Bucket.lastId < MAX_ID
    Bucket.lastId += 1
    Key.id = Bucket.lastId
  Else Key.id = MAX_ID
  Unlock Bucket
```

Optionally, other bucket implementations may be used such as, for example, avoiding the use of locks using Compare and Swap (CAS) operations and architecture support. Optionally, a bucket's structure complies with:
  i) size of chosen set per bucket is one
  ii) size of candidate set per bucket is one
  iii) size of client-set is fixed
Optionally, the above described bucket structure leads to bucket containing the following fields:
  i) byte lastId
  ii) byte chosenId
  iii) int utility of chosen
  iv) byte candidate_id
  v) int utility of candidate
  vi) Int[ ] client set for chosen Optionally, the hybrid management of multiple clients by a server 110 described above, has minimal impact on server 110 read/write path. Optionally, operations performed by the server 110 are constant-time operations e.g. operations which are proportional to the size of the chosen and/or candidates sets are avoided. Optionally, the hybrid management of multiple clients by a server 110 has minimal lock contention overheads. Optionally, the hybrid management of multiple clients by a server 110 does not entail expensive synchronization on scan, update and/or access compared to global chosen and candidate sets. Optionally, the hybrid management of multiple clients and server side cache management units by a server 110 is memory efficient by minimizing pointer overheads. All the options mentioned thus far in this paragraph are achieved by the bucket approach to maintaining chosen/candidate sets. Optionally if client-sets for multiple server side cache management units are identical or similar, they will be stored only once. For example if a given client-set is a subset of another then storing only the larger client set will reduce memory consumption and still be correct (although in this case, on update/delete more clients will be notified that strictly necessary). Optionally, schemes may be adopted to reduce the size of client-sets, e.g. encoding client-id's in a memory efficient manner.

Figure 2:
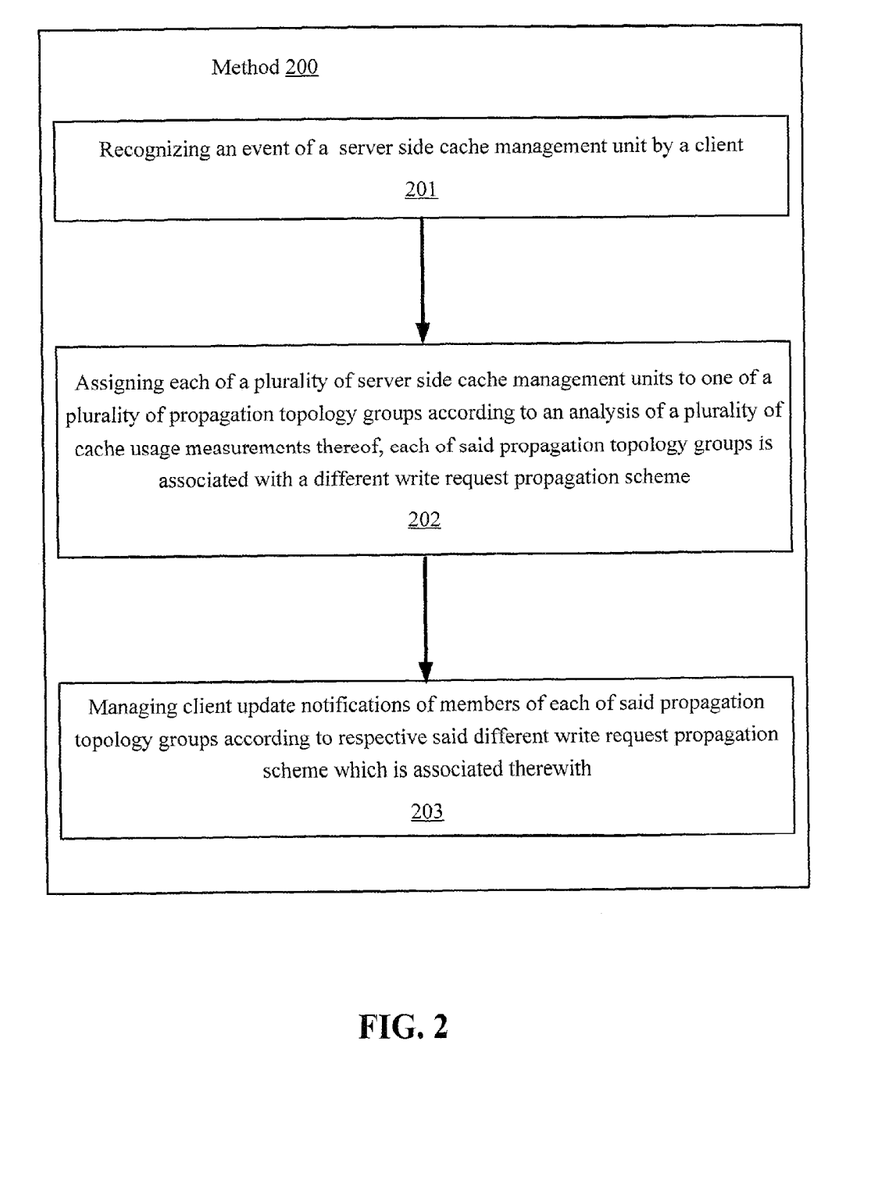
FIG. 2 is an illustration of a computerized method for managing cache messages of a server, according to some embodiments of the current invention.

Reference is also made to FIG. 2 illustrating a computerized method for managing cache messages of a server, according to some embodiments of the current invention. First, an event of a server side cache management unit is recognized by a client 201. Then, each server side cache management unit is assigned to a topology group 202. The assignment is performed according to an analysis of cache usage measurements. Each propagation topology groups is associated with a different write request propagation scheme. Exemplary cache usage measurements comprise number of clients accessing or caching a server side cache management unit within a time period, last time of reading a server side cache management unit, last time of writing a server side cache management unit, transmission size of server side cache management unit over a network, transmission time of server side cache management unit over a network assessing etc. The analysis may be performed for each cache usage measurement as a standalone measurement and/or may be performed for a group of cache usage measurements. The analysis may comprise, for example, setting absolute thresholds, setting relative thresholds, recognizing critical measurements etc. The write request propagation scheme is chosen for each server side cache management unit separately from two or more potential cache policies. For example, the potential cache write request propagation schemes may be a notify-all broadcasting protocol and a local usage dependent updating protocol which is based on maintaining client-sets. Finally, client update notifications of members of each propagation topology group are managed according to respective different write request propagation scheme which is associated therewith.

Optionally, cache usage measurements are not captured, stored and analyzed for each and every server side cache management unit. Maintaining a reduced set of cache usage measurements reduces memory cost and may enable scaling cache consistency management by a server 110 with predefined memory consumption. A set of server side cache management units for which to maintain cache usage measurements may be randomly picked (the candidate set). Out of the picked server side cache management units the, a second and shorted set of server side cache management units for which to maintain client-sets is randomly chosen (the chosen set). During runtime, on every update and/or read of a key, the client-set and/or the cache usage measurements are updated if it is the chosen set and/or the candidate set. For example, on read of a server side cache management unit, also referred to as a cache key, k from client c, c is added to the k's client-set if k is in the chosen set. On read of a server side cache management unit k from client c the k's utility is updated if k is on the candidate set. Utility of keys in the chosen set are periodically compared to keys in the candidate set. Server side cache management units of the chosen set are periodically replaced with other server side cache management units having a utility measurement(s) higher than utilities of server side cache management units in the chosen set. New candidates are periodically chosen. Optionally, the new candidate choice is random. Such a process, of randomly choosing new server side cache management units for the candidate set and replacing server side cache management units in the chosen set according to their utility measurements, may converge over time towards the optimal chosen set. The candidate set may be randomly chosen while the chosen set converges to an optimal and/or near optimal chosen set. The proximity of the convergence towards the optimal sets may depend, among other factors, on the magnitude change and/or on the frequency of change in the workload and access patterns. The above mentioned process (random selection and chosen set replacement) adapts to the changes in clients' workload and access patterns. Such adaptation may lead to a chosen set similar in server side cache management unit composition to the optimal chosen set which balance between memory cost of maintaining client-sets in a cache consistency managing server and the cost in network usage of sending numerous notification messages. Optionally, the balance between client-set memory cost and overheads of sending notification messages is quantified by a predefined formula weighting these parameters.

Periodically, for every key $k_1$ in the candidate set, if there is a key $k_2$ in the chosen set that has a lower usage measurement than the following routine is performed:

I. Remove $k_2$ from chosen, remove $k_1$ from the candidate set

II. Insert $k_1$ into the chosen set

III. Pick new candidates server side cache management units

Optionally, instead of maintaining approximate utilities for keys in the candidates set client-sets and precise utilities may be maintained. This may 'waste' memory on client sets for candidates which may have low utility. It is noted a client-set is maintained for all keys in the chosen set. This poses a problem since on insertion of a key into the chosen set; we may not have a client-set for it (since one may not be maintained for candidate sets). One solution is to move a key from candidate to chosen set when server receives an update for the key from some client. This is because at this time its client set can be reset to consist of only clients performing the update (or to an empty set if it guaranteed that clients do not keep in their cache keys which they update).

Optionally, the server side cache management units are clustered according to their cache usage measurements. Cluster representative(s) are chosen and their cache usage measurements are used to determine the write request propagation scheme for server side cache management units belonging to that cluster.

Optionally, a repeated change of the server side cache management units usage occurs in clients' usage pattern. The clients alternate between two or more states. These states may be, for example, database update, data synchronization, accepting user input etc. In each state the clients' utilization of server side cache management units is different. For each state a unique state-specific candidate set and chosen set is chosen and maintained. Optionally, a switch between these states is automatically detected by a change in server side cache management units pattern of usage, by workload characteristics, by a manual intervention, by a detection of a user command, by the hour of the day and/or by combination thereof. A repeated periodical change in server side cache management unit usage may be automatically detected based on a time pattern. Such detection may enable to alternate between multiple candidate sets and/or multiple chosen sets. For each state a corresponding candidate set and a corresponding chosen set is maintained. While at this state, the corresponding candidate set and the corresponding chosen set are updated and maintained. Upon detection of a switch to a second state the candidate set and chosen set of the first set are saved in their current status. The candidate set and the chosen set corresponding to the second state are then being updated and maintained. Optionally, upon state change detection, the former candidate and chosen sets are modified to reduce their memory saving requirements. For example, history data may be partially and/or completely deleted from sets and/or the data may be compressed by a compression algorithm.

Optionally, a user manually chooses a substitute write request propagation scheme for at least one server side cache management unit. The substitute write request propagation scheme over-rides automatically chosen said write request propagation scheme.

Figure 3:
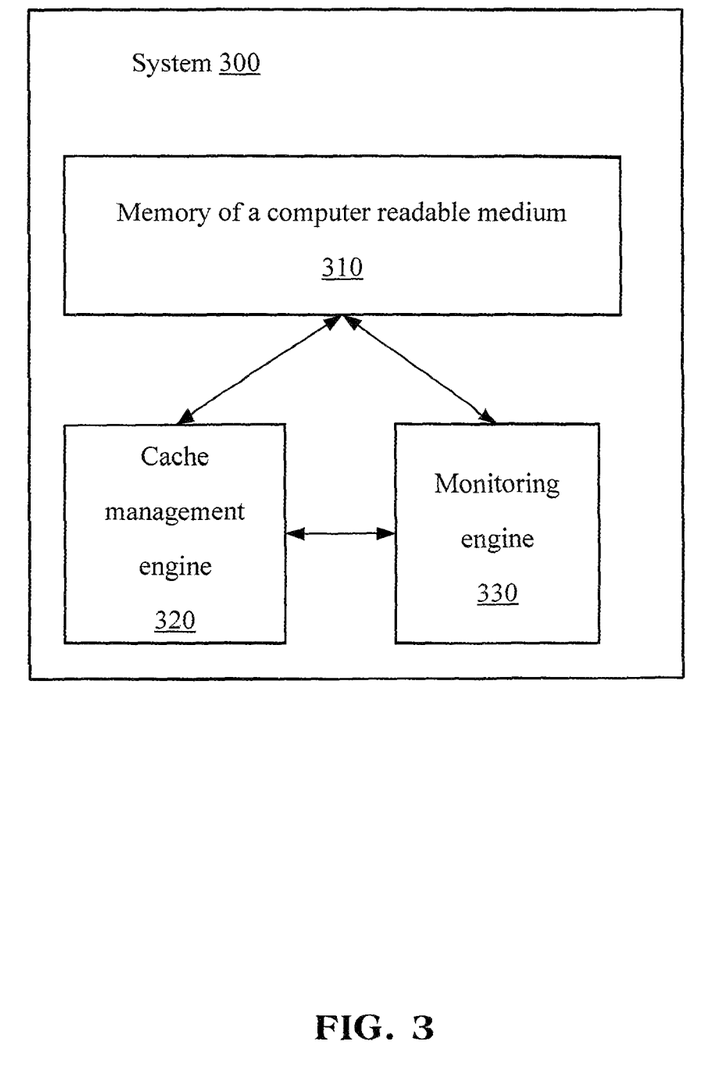
FIG. 3 is an illustration of a system for managing cache messages, according to some embodiments of the current invention.

Reference is also made to FIG. 3 illustrating a system 300 for managing cache messages, according to some embodiments of the current invention. The system 300 comprises: a monitoring engine 330, a cache management engine 320 and a memory of a computer readable medium 310. The memory 310 is connected to the cache management engine 320. The cache management engine 320 may be part of a cache management server 110. The monitoring engine 330 chooses which usage measurements to monitor. Cache usage measurements of server side cache management units by clients 101-104 are collected by the monitoring engine 330. The values of these cache usage measurements are stored, by the monitoring engine 330, on the computer readable medium 310. Optionally, different optional component of the system 300 such as, for example, a module installed in each client 101-104 may perform usage measurements monitoring. The cache management engine 320 analyzes the stored cache usage measurements and assigns a write request propagation scheme accordingly, for example, as detailed in FIG. 1 and/or FIG. 2. The choice of write request propagation scheme based on cache usage measurements is automatically performed by the cache management engine 320. The cache propagation schemes are, for example, as described in FIG. 1 and/or FIG. 2. Optionally, the cache management engine 320 is a system 300 element independent of the cache management server 110 and/or a set of distributed elements communicating with a cache management server 110. Optionally, the two sets, i.e. the candidate set and the chosen set, are implemented as one of the following data structures: A) Maintaining two set distinct data-structures. B) Periodically sorting each set by utility and then replacing low-utility chosen server side cache management units with high-utility candidates. Optionally, a priority queue is used instead of sorting. C) Maintaining average utility of chosen server side cache management units and periodically going over candidates. Every candidate server side cache management unit having a utility measurement higher than average of the chosen server side cache management units is replaces a chosen server side cache management unit with lowers than average utility. Optionally, a median utility measurement of the chosen server side cache management units is used, mutatis mutandis, rather than an average. Optionally the average and/or the median is calculated periodically rather than maintained all along. D) Maintaining a single data-structure. Chosen server side cache management units are saved in a data structure. Periodically lower-utility server side cache management units are removed from it and replaced with random keys.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant server side cache management units, write request propagation scheme and/or cache usage measurements will be developed and the scope of the term server side cache management units, cache protocols and/or cache usage measurements are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for dynamic consistency management of server side cache management units in a distributed cache, comprising:
    collecting a plurality of cache usage measurements of a plurality of server side cache management units;
    storing at least one of said plurality of server side cache management units responsive to a chosen write request propagation scheme;
    estimating an amount of distributed messages saved by said storing;
    analyzing said plurality of cache usage measurements to assess a utilization of each of said plurality of server side cache management units by a plurality of clients;
    recognizing an event of one of said plurality of server side cache management units by a client;
    assigning each of said plurality of server side cache management units to one of a plurality of propagation topology groups according to said utilization, each of said propagation topology groups is associated with a different write request propagation scheme, wherein said different write request propagation scheme comprises instructions for managing updates of said plurality of server side cache management units; and
    managing client update notifications of members of each of said propagation topology groups according to respective said different write request propagation scheme which is associated therewith
    wherein said analyzing is performed by calculating a ratio between estimated said amount of distributed messages and a digitalized-memory size used for said storing of said server side cache management units.

2. The method of claim 1, wherein said event comprises at least one of writing an element of said server side cache management unit, reading an element of said server side cache management unit, changing load of a network connecting said client and said server, changing load on client itself, notification by said client concerning eviction of a client side cache management unit and passing time.

3. The method of claim 1, wherein a write request propagation scheme is at least one of:
a client-set write request propagation scheme recording a plurality of clients sets and according to clients' access to said plurality of server side cache management units and sending a plurality of cache messages according to said plurality of clients sets; and
a least recently used write request propagation scheme, recording usage time for said plurality of server side cache management units and sending a plurality of cache messages for least recently used server side cache management units wherein each said plurality of clients sets is a sub-group chosen from a plurality of clients.

4. The method of claim 3, wherein said assigning each of a plurality of cache management units is to one of two propagation topology groups.

5. The method of claim 4, further comprising:
associating said client-set write request propagation scheme with first of said two propagation topology groups; and
associating a notifying all clients write request propagation scheme with second of said two propagation topology groups.

6. The method of claim 1, wherein a write request propagation scheme is at least one of notifying all clients, a broadcasting protocol, a periodic update protocol for sending periodic cache updates to at least one client cache.

7. The method of claim 1, wherein said assigning is performed independently of a cache transaction.

8. The method of claim 1, further comprising:
bounding a memory of a computer readable medium; and
storing at least one of a plurality of cache datums responsive to a chosen write request propagation scheme in bounded said memory.

9. The method of claim 1, further comprising:
manually choosing, by a user, a substitute write request propagation scheme for at least one of said plurality of server side cache management units, said substitute write request propagation scheme over-riding an automatically chosen write request propagation scheme.

10. The method of claim 1, wherein a plurality of write request propagation scheme supporting measurements are recorded on a server local storage by one write request propagation scheme.

11. The method of claim 1, wherein said analyzing and said assigning are iteratively repeated.

12. A system for dynamic cache consistency management of server side cache management units by assignment of server side cache management units to write request propagation schemes, comprising:
a memory of a computer readable medium, said memory stores a dynamic cache consistency management code;
a processor executing said dynamic cache consistency management code for:
automatically choosing, using a computerized processor, a subset of a plurality of cache usage measurements for monitoring,
monitoring said subset of said plurality of cache usage measurements,
storing a plurality of values of said plurality of cache usage measurements collected by said monitoring on said memory,
analyzing stored said plurality of values to assess a utilization of a plurality of server side cache management units by a plurality of clients, and
automatically assigning, using a computerized processor, each of said plurality of server side cache management units, each datum having said plurality of cache usage measurements, to a write request propagation scheme according to said utilization, wherein said write request propagation scheme comprises instructions for managing updates of each of said plurality of server side cache management units;
wherein said processor is further configured for executing said code for:
instructing a storage of at least one of said plurality of server side cache management units responsive to chosen said write request propagation scheme;
estimating an amount of distributed messages saved by storing for a server side cache management unit; and
wherein said analying is performed by calculating a ratio analyzing by calculating a ratio between estimated said amount of distributed messages and a digitalized-memory size used for said storing of said server side cache management unit.

13. The system of claim 12, wherein said processor instructs storing at least one of said plurality of server side cache management units responsive to chosen said write request propagation scheme in said memory.

14. The system of claim 12, wherein said automatically choosing is randomly selected.

15. The system of claim 12, wherein said automatically assigning is initiated as a random assignment of one of said plurality of write request propagation schemes to each of said plurality of server side cache management units.

* * * * *